United States Patent
Stefanov et al.

(10) Patent No.: US 8,275,210 B2
(45) Date of Patent: Sep. 25, 2012

(54) LOSSLESS COMPRESSOR FOR IMAGE DATA VALUES

(75) Inventors: Ekaterina Stefanov, Normanhurst (AU); David Robert James Monaghan, Eastwood (AU)

(73) Assignee: Canon Kabushiki Kaisha, Tokyo (JP)

( * ) Notice: Subject to any disclaimer, the term of this patent is extended or adjusted under 35 U.S.C. 154(b) by 979 days.

(21) Appl. No.: 12/274,528

(22) Filed: Nov. 20, 2008

(65) Prior Publication Data

US 2009/0154818 A1 Jun. 18, 2009

(30) Foreign Application Priority Data

Dec. 18, 2007 (AU) .................................. 2007249106

(51) Int. Cl.
*G06K 9/36* (2006.01)
(52) U.S. Cl. .................. 382/244; 382/232; 382/233
(58) Field of Classification Search .................. 382/232, 382/239, 244; 375/240.03, 240.02; 348/391.1; 358/426.13; 708/300, 319
See application file for complete search history.

(56) References Cited

U.S. PATENT DOCUMENTS

| | | | |
|---|---|---|---|
| 5,680,129 A | 10/1997 | Weinberger et al. | |
| 5,835,034 A | 11/1998 | Seroussi et al. | 341/65 |
| 5,903,676 A | 5/1999 | Wu et al. | 382/244 |
| 6,198,508 B1 * | 3/2001 | Jang et al. | 348/391.1 |
| 6,285,790 B1 | 9/2001 | Schwartz | |
| 6,856,701 B2 | 2/2005 | Karczewicz et al. | 382/247 |
| 6,894,628 B2 | 5/2005 | Marpe et al. | 341/107 |
| 2006/0050972 A1 | 3/2006 | Reznic et al. | |
| 2007/0154106 A1 | 7/2007 | Koziarz | |

OTHER PUBLICATIONS

Takamura, S. et al., "Lossless Image Compression with Lossy Image Using Adaptive Prediction and Arithmetic Coding", Proc. Data Compression Conference, pp. 166-174 (1994).
Weinberger, M. et al, "The LOCO-I Lossless Image Compression Algorithm: Principles and Standardization into JPEG-LS", Hewlett-Packard Laboratories, Technical Report No. HPL-98-193R1, Nov. 1998, revised Oct. 1999.

* cited by examiner

*Primary Examiner* — Anh Hong Do
(74) *Attorney, Agent, or Firm* — Fitzpatrick, Cella, Harper & Scinto

(57) ABSTRACT

Disclosed is method of encoding a set of data values (205-245). Each data value corresponds to a pixel position (205, 210, 220, 225) within an image (100). The method operates on a current (230) said data value at a current pixel position. The method creates (605) a context set (215, 225) for the data value (230), the context set including a data value at a pixel position (225) in the set immediately preceding the current pixel position in an encoding order, wherein the immediately preceding pixel position is not adjacent said current pixel position within said image. The method then encodes (500) the data value (230) using the created context set (215, 225). A corresponding decoding method is also provided.

21 Claims, 13 Drawing Sheets

LOSSLESS COMPRESSOR FOR IMAGE DATA VALUES

TECHNICAL FIELD

The present invention relates to image compression/decompression and, more particularly, to image compression in a tiled image processing system where memory resources are limited.

BACKGROUND

In colour printing environments the total uncompressed size of a generated pixel image is often large and it is advantageous to avoid storing the entire image uncompressed. Such pixel images are typically generated in raster or band order. In particular, pixels, scanlines, groups of scanlines (bands), or tiles, each defining a particular minimal coding unit, are emitted in a stream from a raster image processor that has as input an object graphic description of the page to be printed. The stream data is often formed by pixel colour values, but may be other information relating to the image being generated. Collectively these types of information shall be referred to herein as image data.

Hybrid compression techniques may be applied to image data in order to improve compression. Within a hybrid system there are at least two compression engines (encoders) used alongside one another.

Hybrid compression necessitates some form of image segmentation or differentiation to thereby identify what image data is to be compressed with one type of compressor, and what image data is to be compressed with another type of compressor. Examples of image segmentation exist throughout the art and include region growing and edge detection, to name but two.

Image data can be compressed losslessly using any general lossless compression method. Run-length encoding, entropy encoding, dictionary-based methods, and various combinations of those have been used in lossless image compression. With an appropriately segmented image, taking advantage of any image data information about neighbouring (or adjacent) pixel positions within a segment or region tends to improve the lossless compression result for a current pixel position due to a spatial correlation between neighbouring image data values. Context set (or context) in the literature refers to the set of pixels within which the current pixel occurs and is used to encode the current pixel value. Most often the context is made of several of the pixels adjacent the position of the current pixel. U.S. Pat. No. 5,680,129 (Weinberger et. al.), published Oct. 21, 1997, describes a method in which the context comprises three immediate neighbours above the current pixel position, and the neighbour immediately to the left of the current pixel position. The method determines a predicted value for the current pixel and encodes the residual of (difference between) the actual pixel value and the predicted value.

The paper "Lossless Image Compression with Lossy Image Using Adaptive Prediction and Arithmetic Coding"; Seishi Takamura, Mikio Takagi: Data Compression Conference 1994, pp. 166-174, 1994, proposes a method which uses up to ten pixels, some of which are immediate neighbours and the rest are adjacent to those immediate neighbours. The context set is computed amongst those ten pixels. United States Patent Publication No. 20060050972 A1 (Reznic) published Mar. 9, 2006 uses a method where the context set is constructed amongst pixels lying on a straight line between two chosen neighbouring pixels. United States Patent Publication No. 20070154106 A1 (Koziarz) published Jul. 5, 2007 describes a context set comprising pixels at predetermined offsets from the current pixel. These offsets are adaptively determined for each scanline using statistical information about the values of those pixels.

U.S. Pat. No. 6,285,790 (Schwartz), published Sep. 4, 2001, includes pixel position information to further improve compression when the image data is a collection of smaller images, such as sprites, characters, or a graphical menu. Some neighbouring pixels might be independent of the pixel being coded and, therefore are excluded from the context set of a given pixel. This method, however, does not use correlation between data from similar non-adjacent regions.

The above approaches use either a fixed context set or vary the context set according to the data profile. While a disadvantage of a fixed context set is its lack of flexibility and thus potentially smaller compression gains, dynamic context set formation is both complex and time consuming. Therefore, it is desirable to somehow combine the simplicity of a fixed context set and the flexibility of dynamic set formation.

Most context encoders in the art, including the above-mentioned, are based on a predictor known in the art as MED (Median Edge Detector), described for example in the aforementioned U.S. Pat. No. 5,680,129. The MED predictor uses the data trend over the context set in order to predict the current value. Since it is invoked at each pixel, use of the MED predictor is computationally intensive. After calculation of the residuals using MED, these can be coded using a given compression method such as Huffman coding or using Golomb codes.

SUMMARY

It is an object of the present invention to substantially overcome or at least ameliorate one or more deficiencies of known compression methods.

The methods presently disclosed define a dynamic context set depending on the current pixel position within a region or "patch" of pixel positions to be similarly compressed (ie. using one encoder in a hybrid system) and the position of that compression region with regards to any previously encountered compression regions within a tile.

The context set may comprise one or more of: the pixel position just above the current pixel position, the pixel position immediately to the left of the current pixel position, and the previously visited and processed pixel position (if different from the first two pixel positions). Depending on the topology of the compression regions, one or more of these context set values may be excluded from the context set of a given pixel position when information from those pixel positions is not available. The image data values from the context set for a given pixel position are then used to encode the image data value at that pixel position.

In accordance with one aspect of the present disclosure there is provided a method of encoding a set of data values, each said data value corresponding to a pixel position within an image, said method comprising, for a current said data value at a current pixel position, the steps of:

(a) creating a context set for said data value, said context set including a data value at a pixel position in said set immediately preceding said current pixel position in an encoding order, wherein said immediately preceding pixel position is not adjacent said current pixel position within said image; and (b) encoding said data value using said created context set.

In accordance with another aspect of the present disclosure there is provided a method of encoding a set of data values, each said data value corresponding to a pixel position within an image, said method comprising, for a current said data value at a current pixel position, the steps of:

(a) creating a context set comprising a plurality of previously encoded data values;

(b) computing a difference value using said current data value and each said data value in said context set; and (c) encoding said current data value by encoding the least positive said computed difference value.

In accordance with another aspect of the present disclosure there is provided a method of decoding an encoded set of data values, each said data value corresponding to a pixel position within an image, said method comprising, for a current said encoded data value at a current pixel position, the steps of:

(a) creating a context set comprising a plurality of previously decoded data values;

(b) computing possible values using a difference value and said decoded data values in said context set; and (c) decoding said encoded data value by selecting one of the computed possible values.

Other aspects are also disclosed.

BRIEF DESCRIPTION OF THE DRAWINGS

At least one embodiment of the present invention will now be described with reference to the drawings, in which.

DETAILED DESCRIPTION INCLUDING BEST MODE

The principles of the arrangements described herein have general applicability to image compression and decompression. For ease of explanation, the arrangements are described with reference to image compression used in a color raster image processing system. It is not intended that the present invention be limited to the described arrangements. For example, the invention may have application to any arrangement utilizing compression where memory resources are limited.

Figure 6:
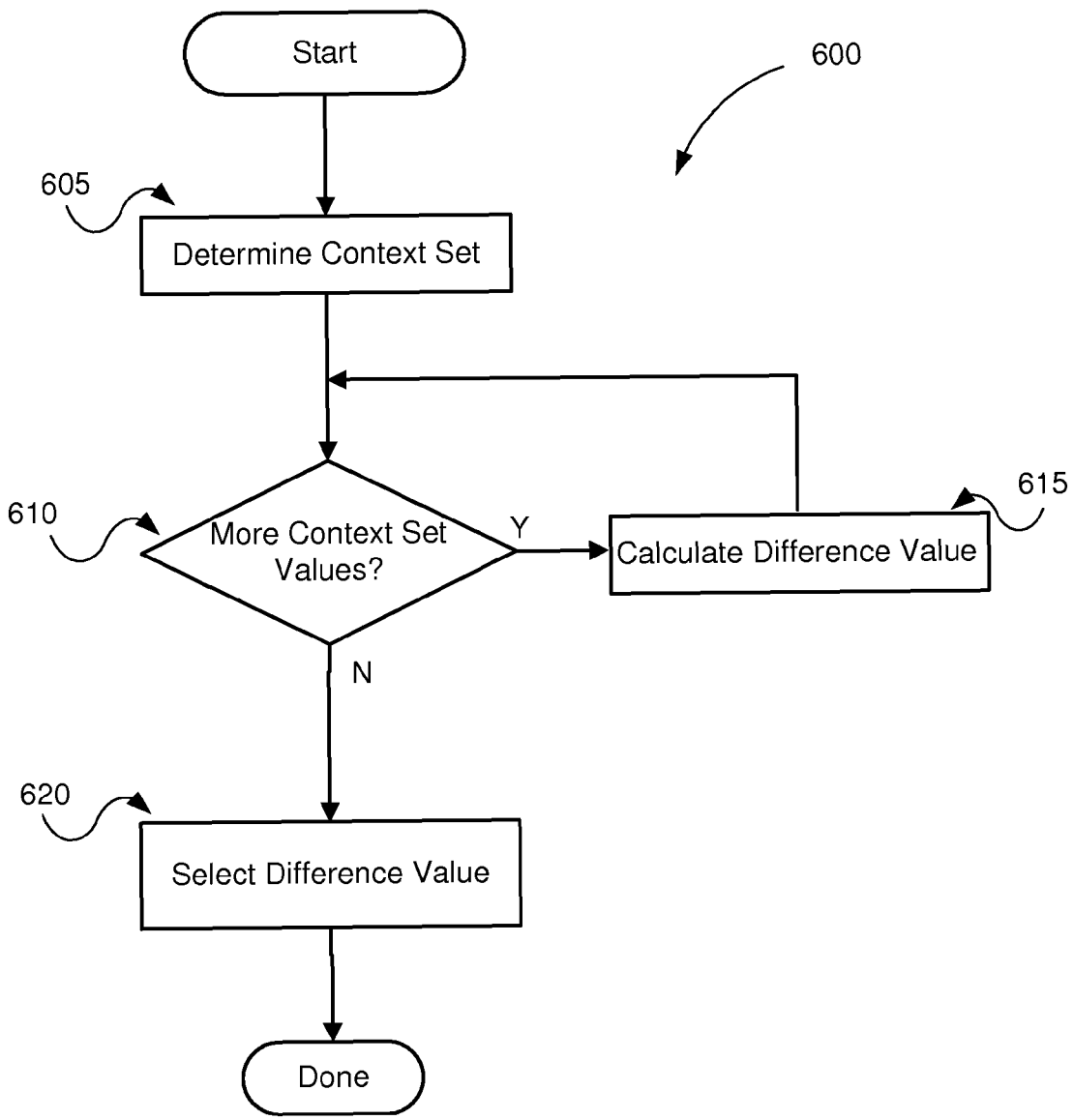
FIG. 6 is a schematic flow diagram showing the Compute Difference process in FIG. 5 executed for a given pixel position.
Figure 7:
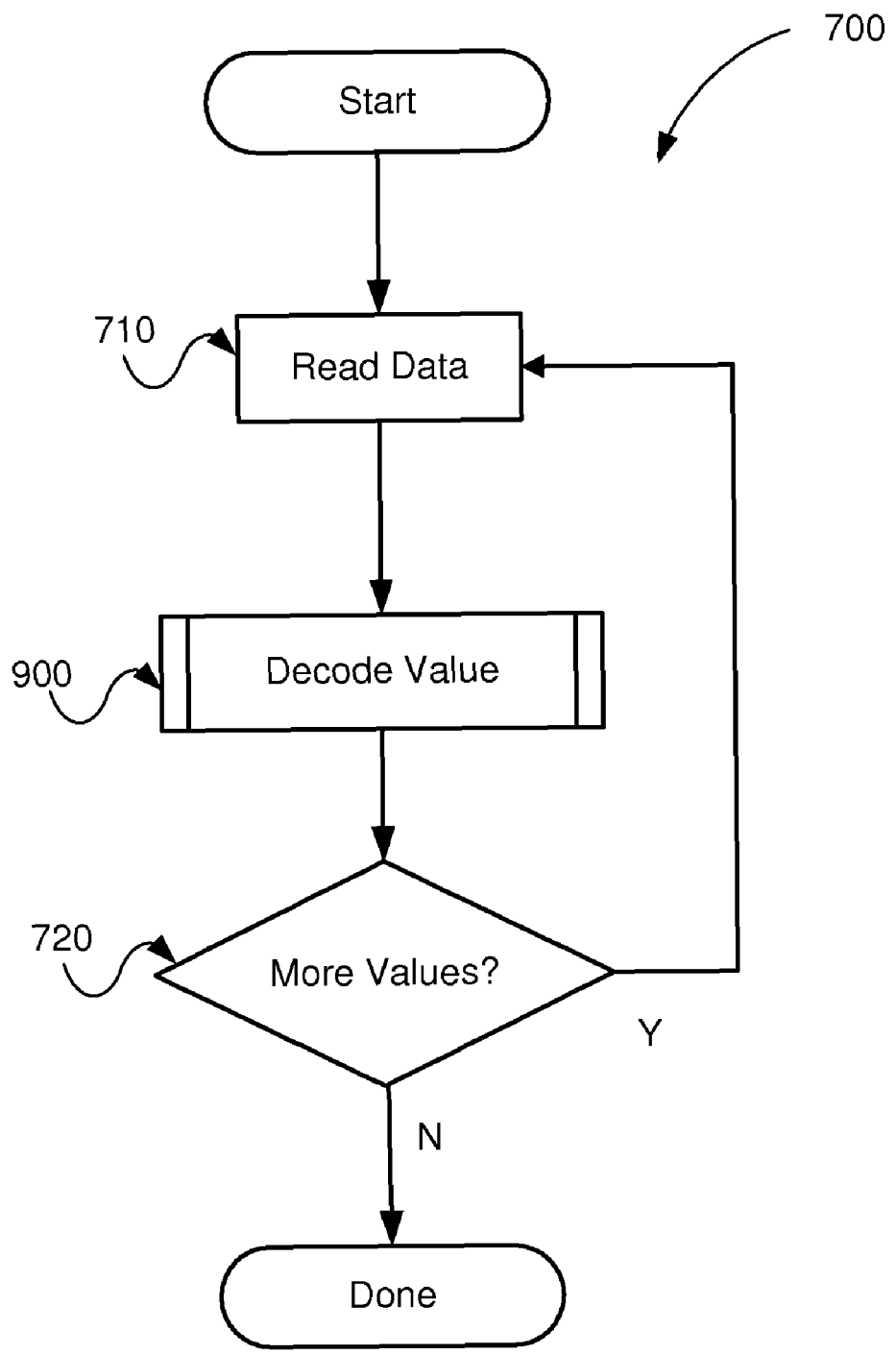
FIG. 7 is a schematic flow diagram showing the decoding process carried out by Context Decoder 425 within the Hybrid Decompression System of FIG. 4.
Figure 8:
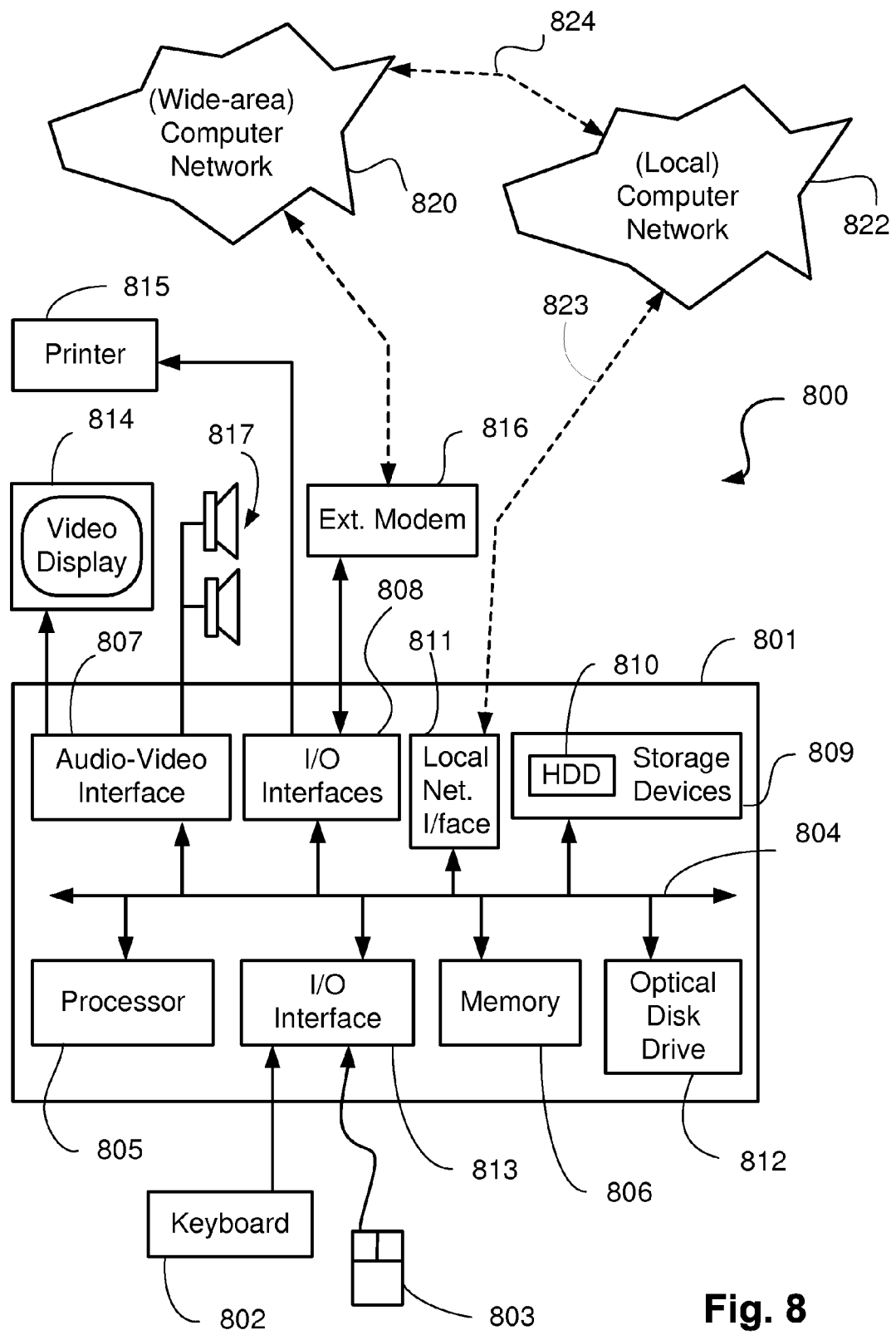
FIG. 8 is a schematic block diagram representation of a general purpose computer system within which the arrangements described herein may be implemented.

The methods of image compression and decompression may be implemented using a computer system 800, such as that shown in FIG. 8 wherein the processes of FIGS. 1 to 7, 9 and 10 may be implemented as software, using one or more application programs executable within the computer system 800. In particular, the steps of image compression and image decompression are effected by instructions in the software that are carried out within the computer system 800. The instructions may be formed as one or more code modules, each for performing one or more particular tasks. The software may also be divided into two separate parts, in which a first part and the corresponding code modules performs the compression and decompression methods and a second part and the corresponding code modules manage a user interface between the first part and the user. The software may be stored in a computer readable medium, including the storage devices described below, for example. The software is loaded into the computer system 800 from the computer readable medium, and then executed by the computer system 800. A computer readable medium having such software or computer program recorded on it is a computer program product. The use of the computer program product in the computer system 800 preferably effects an advantageous apparatus for image compression and image decompression.

As seen in FIG. 8, the computer system 800 is formed by a computer module 801, input devices such as a keyboard 802 and a mouse pointer device 803, and output devices including a printer 815, a display device 814 and loudspeakers 817. An external Modulator-Demodulator (Modem) transceiver device 816 may be used by the computer module 801 for communicating to and from a communications network 820 via a connection 821. The network 820 may be a wide-area network (WAN), such as the Internet or a private WAN. Where the connection 821 is a telephone line, the modem 816 may be a traditional "dial-up" modem. Alternatively, where the connection 821 is a high capacity (eg: cable) connection, the modem 816 may be a broadband modem. A wireless modem may also be used for wireless connection to the network 820.

The computer module 801 typically includes at least one processor unit 805, and a memory unit 806 for example formed from semiconductor random access memory (RAM) and read only memory (ROM). The module 801 also includes an number of input/output (I/O) interfaces including an audio-video interface 807 that couples to the video display 814 and loudspeakers 817, an I/O interface 813 for the keyboard 802 and mouse 803 and optionally a joystick (not illustrated), and an interface 808 for the external modem 816 and printer 815. In some implementations, the modem 816 may be incorporated within the computer module 801, for example within the interface 808. The computer module 801 also has a local network interface 811 which, via a connection 823, permits coupling of the computer system 800 to a local computer network 822, known as a Local Area Network (LAN). As also illustrated, the local network 822 may also couple to the wide network 820 via a connection 824, which would typically include a so-called "firewall" device or similar functionality. The interface 811 may be formed by an Ethernet™ circuit card, a wireless Bluetooth™ or an IEEE 802.11 wireless arrangement.

The interfaces 808 and 813 may afford both serial and parallel connectivity, the former typically being implemented according to the Universal Serial Bus (USB) standards and having corresponding USB connectors (not illustrated). Storage devices 809 are provided and typically include a hard disk drive (HDD) 810. Other devices such as a floppy disk drive and a magnetic tape drive (not illustrated) may also be used. An optical disk drive 812 is typically provided to act as a non-volatile source of data. Portable memory devices, such optical disks (eg: CD-ROM, DVD), USB-RAM, and floppy disks for example may then be used as appropriate sources of data to the system 800.

The components 805, to 813 of the computer module 801 typically communicate via an interconnected bus 804 and in a manner which results in a conventional mode of operation of the computer system 800 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 810 and are read and controlled in execution by the processor 805. Intermediate storage of such programs and any data fetched from the networks 820 and 822 may be accomplished using the semiconductor memory 806, possibly in concert with the hard disk drive 810. In some instances, the application programs may be supplied to the user encoded on one or more CD-ROM and read via the corresponding drive 812, or alternatively may be read by the user from the networks 820 or 822. Still further, the software can also be loaded into the computer system 800 from other computer readable media. Computer readable storage media refers to any storage medium that participates in providing instructions and/or data to the computer system 800 for execution and/or processing. Examples of such storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 801. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 814. Through manipulation of the keyboard 802 and the mouse 803, a user of the computer system 800 and the application may manipulate the interface to provide controlling commands and/or input to the applications associated with the GUI(s).

The methods of image compression and decompression may alternatively be implemented in dedicated hardware such as one or more integrated circuits performing one or more of the functions or sub functions to be described. Such dedicated hardware may include graphic processors, digital signal processors, or one or more microprocessors and associated memories, or an application specific integrated circuit.

Figure 1A:
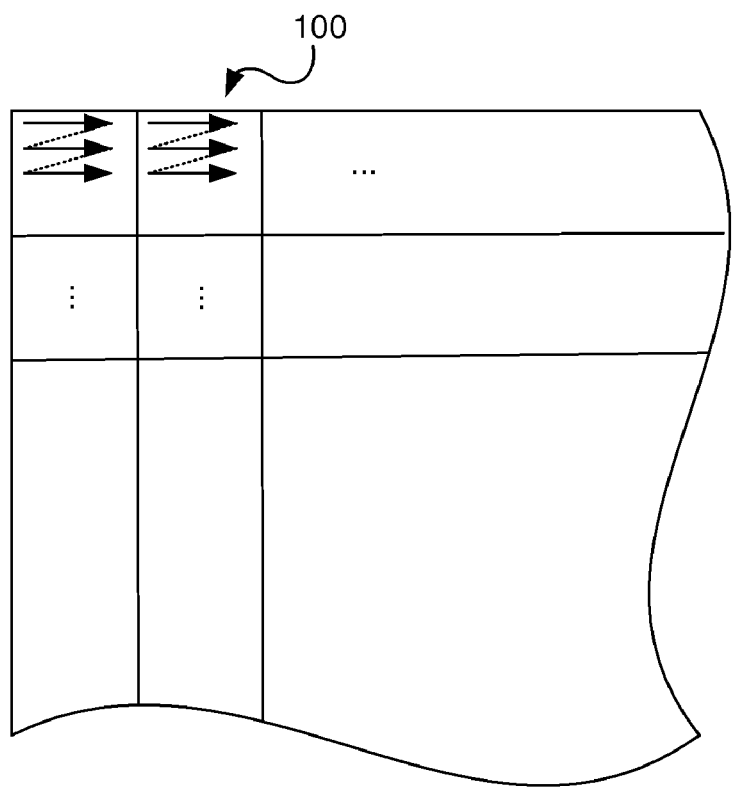
FIG. 1a illustrates a portion of a page of tiles.
Figure 1B:
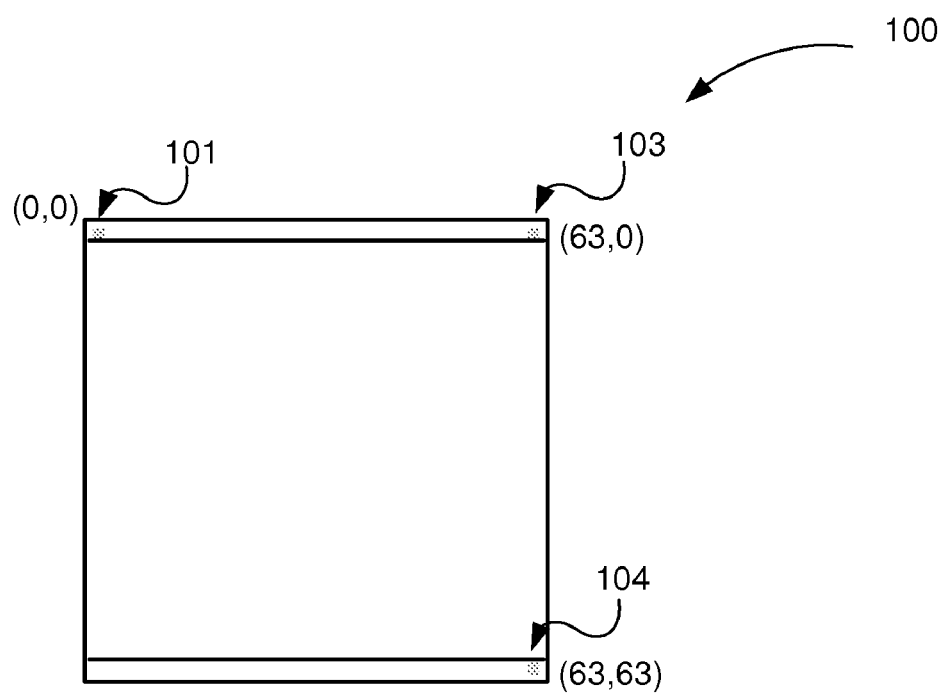
FIG. 1b illustrates a structure of a tile.

The methods to be described compress and decompress image data as tiles. Referring to FIG. 1a, a page will be described. A page may be considered to consist of blocks 100 of pixels wherein there are multiple blocks across the width of the page and multiple blocks down the length of the page. These blocks, consisting of P by Q pixels, may each be referred to as a tile. The tiles are preferably disjoint whilst collectively covering the page. Referring to FIG. 1b, a tile 100 will be described. For example, for an A4 page at a printer resolution of 600 dpi, a suitable choice for tile dimensions is $P=Q=64$, giving 4096 pixels per tile. The position of a pixel, (p, q) where p, q are integers, within a tile is relative to the upper left hand corner of the tile. q indexes the tile rows whereas p indexes the offset of a pixel along a tile row. A tile row consists of the set of pixels that span the width of the tile. For example the first pixel in the first tile row occupies pixel position (0, 0) 101 whereas the last pixel in first tile row occupies pixel position (63, 0) 103. Accordingly, the last pixel in the last tile row occupies position (63, 63) 104. Where the dimensions of a page do not contain an integer number of tiles the page is preferably padded to the required size. Typically tiles are processed one after the other, though they may also be processed in parallel.

Raster tile order refers to the processing of a tile in a pixel by pixel and tile row by tile row fashion, in sequential order, starting with the first tile row and ending with the last row in the tile, as illustrated within tile 100 of FIG. 1a. Raster tile order is the preferred encoding order of the disclosed encoding method, but any other encoding order (e.g. reverse raster tile order) may be used as long as it is known to the decoder.

Image data values refer to pixels or other data representing an image. Each pixel position as described above has one or more image data values associated with it. This can include the pixel's colour (eg. in RGB, CMYK, or YCrCb format), and whether the pixel belongs to the background or foreground of the image, etc. The described methods are applicable, but not restricted to, such image data values, represented as non-negative integers. Other forms of image data values include indices or other data which references the pixel colour data, which might be stored in a separate memory location. For example, a raster image processor may generate fill indices each referencing a specific colour value stored in memory. Having generated the fill indices, the colour of the image may be changed, not by regenerating the fill indices, but by updating the colour values in memory. The index approach is convenient where certain colours are replicated in an image, such as plane fills or uniform composited fills.

When tile image data is split into data streams that are passed to different compression engines, it is said that hybrid compression has been used. The splitting of the tile image data results in a segmentation of the image data into regions of like data values, subject to the form of segmentation being performed. For example a tile with two black text characters C and E overlying a background multicolour bitmap could be segmented into three regions, two formed by the characters and a remainder formed by the bitmap. In a hybrid system it is desirable to compress these regions separately. For example the text characters are desirably compressed with a lossless compression scheme, whereas the bitmap may be compressed in another fashion, for example with a lossy approach such as JPEG.

A compression region in the context of this description is a portion of a tile made up of one or more adjacent pixel positions whose corresponding image data values are to be compressed using the methods described herein. According to the above example, such would be the regions formed by the text characters C and E for the tile in question. A tile may include multiple compression regions, each occupying at least one pixel position, and the compression regions may relate to respective compression approaches with a hybrid system. The methods described herein are applicable to multiple compression regions in a tile and associated with one (like) type of compression approach. The compression regions may be arbitrarily sized and shaped.

Figure 2A:
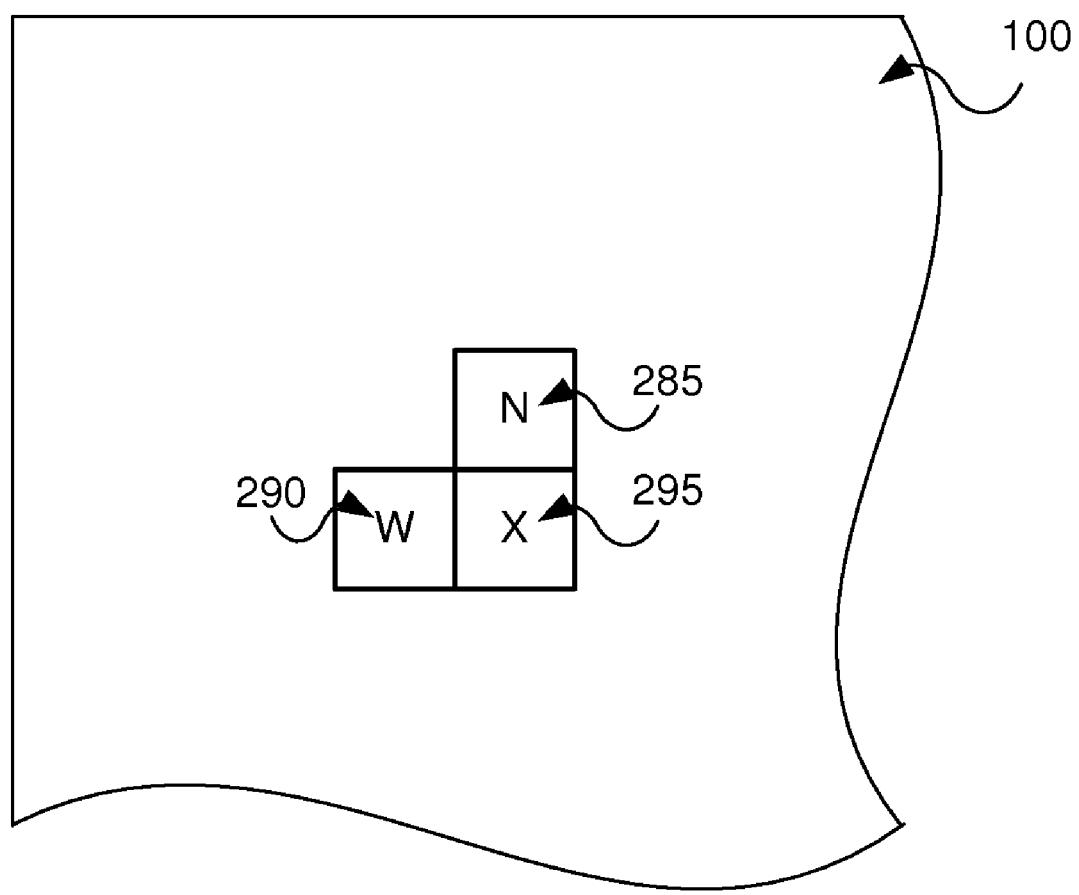
FIG. 2a illustrates a context set of a pixel position X in a tile.

Context image data values are used to encode the image data value at a current pixel position within a compression region. FIG. 2a shows a portion of the tile 100 illustrating, in terms of raster pixel position order processing, a current pixel position X 295 together with its immediate neighbours, or adjacent pixel positions, 285 (labelled N for North) and 290 (labelled W for West) within one compression region. The values at these neighbours N 285 and W 290 create or otherwise form the context set of the current pixel position value X, 295. The rules for creating a context set for a given pixel position are established for the type of compression region or the type of compression to be performed and depend on the shape or configuration of pixels in the compression region and the existence of any other like compression regions preceding the current compression region in the same tile in encoding order.

Figure 11:
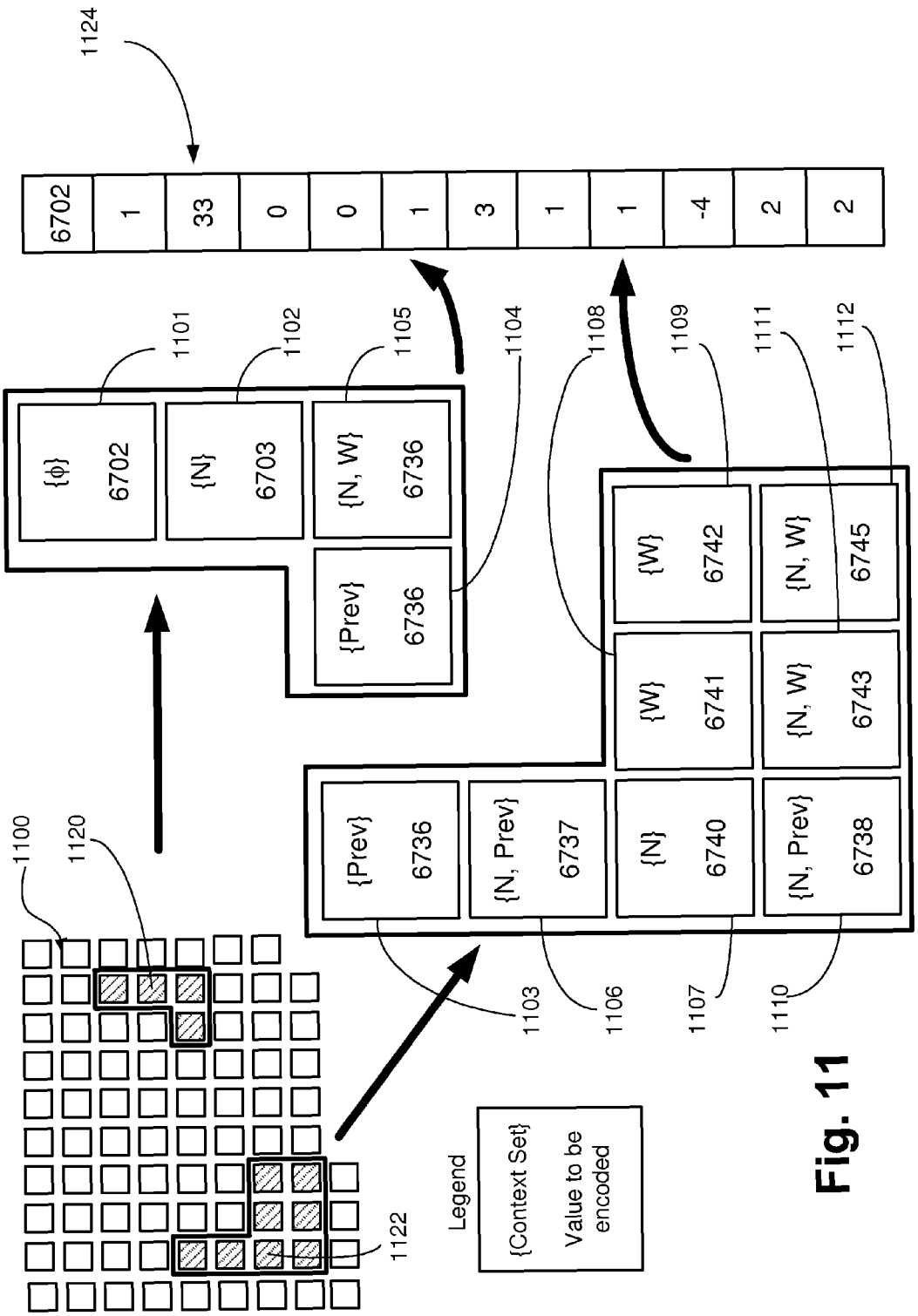

Raster order processing is a preferred encoding order as it offers a number of advantages. Firstly, decoding, and hence rendering, can be performed in one pass, making decoding faster and also eliminating the need for intermediate storage for regions decompressed in non-raster order before rendering. A second advantage is that the last value of another region on the same scanline can be used as Prev, if no immediate context exists for a given pixel position. In the absence of Prev that pixel position would have to be encoded using its raw value. For example, pixel position 1104 on FIG. 11 is encoded as 0, instead of using the raw value of 6736, a much bigger number than 0.

In FIG. 2a, the arrangement of the pixel positions 285, 290 and 295 provide a context set {N, W} for the pixel position 295. Examples of the various possible context sets according to the preferred arrangements of the present disclosure are given on FIG. 2b and these are described below. Other arrangements may be based on context sets other than {N, W} (for example, {N, W, NW}, where NW denotes the northwest pixel position) provided they are causal (i.e. use only pixel positions preceding the current pixel in encoding order).

In addition to N and W, the context set according to the disclosed arrangements can include an entity labelled "Previous" or "Prev". Prev is defined as the data value at the pixel position immediately preceding the pixel position of the current data value, in the same or a different compression region, in encoding order. Typically this is within the same tile.

Figure 3:
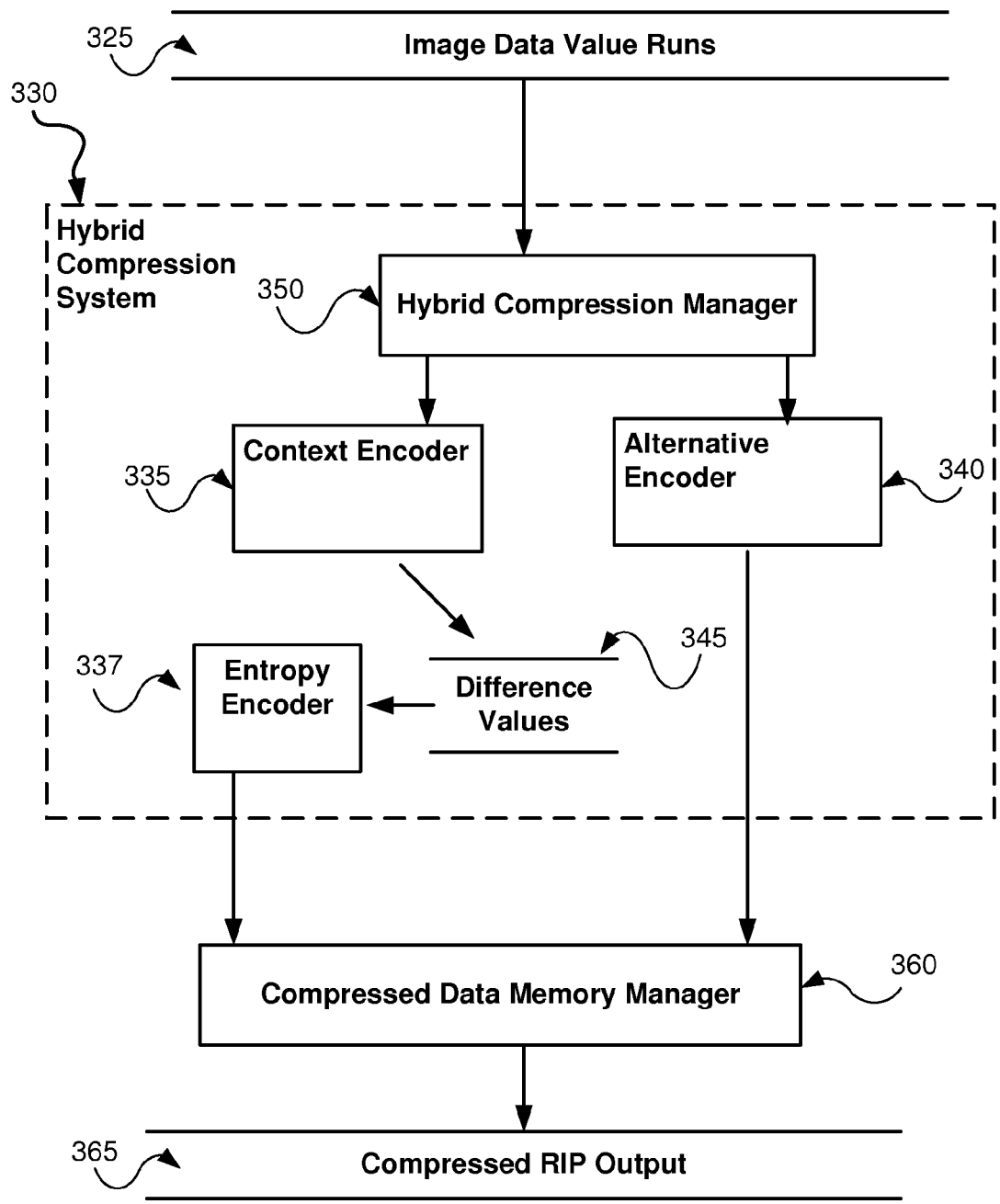
FIG. 3 is a schematic dataflow diagram showing a Hybrid Compression System according to the present disclosure.

FIG. 3 shows data flow within a hybrid compression system 330. Image data value runs 325 are received by a hybrid compression manager 350 which segments each tile of image values into compression regions that can be encoded using a context encoder 335 and other regions that are to be encoded using an alternative encoder 340. Regions, defined by identical data values where the number of identical data values exceeds a predetermined threshold, are passed for compression to the Alternative Encoder 340. The remaining segments in the tile are encoded with Context Encoder 335.

Figure 2B:
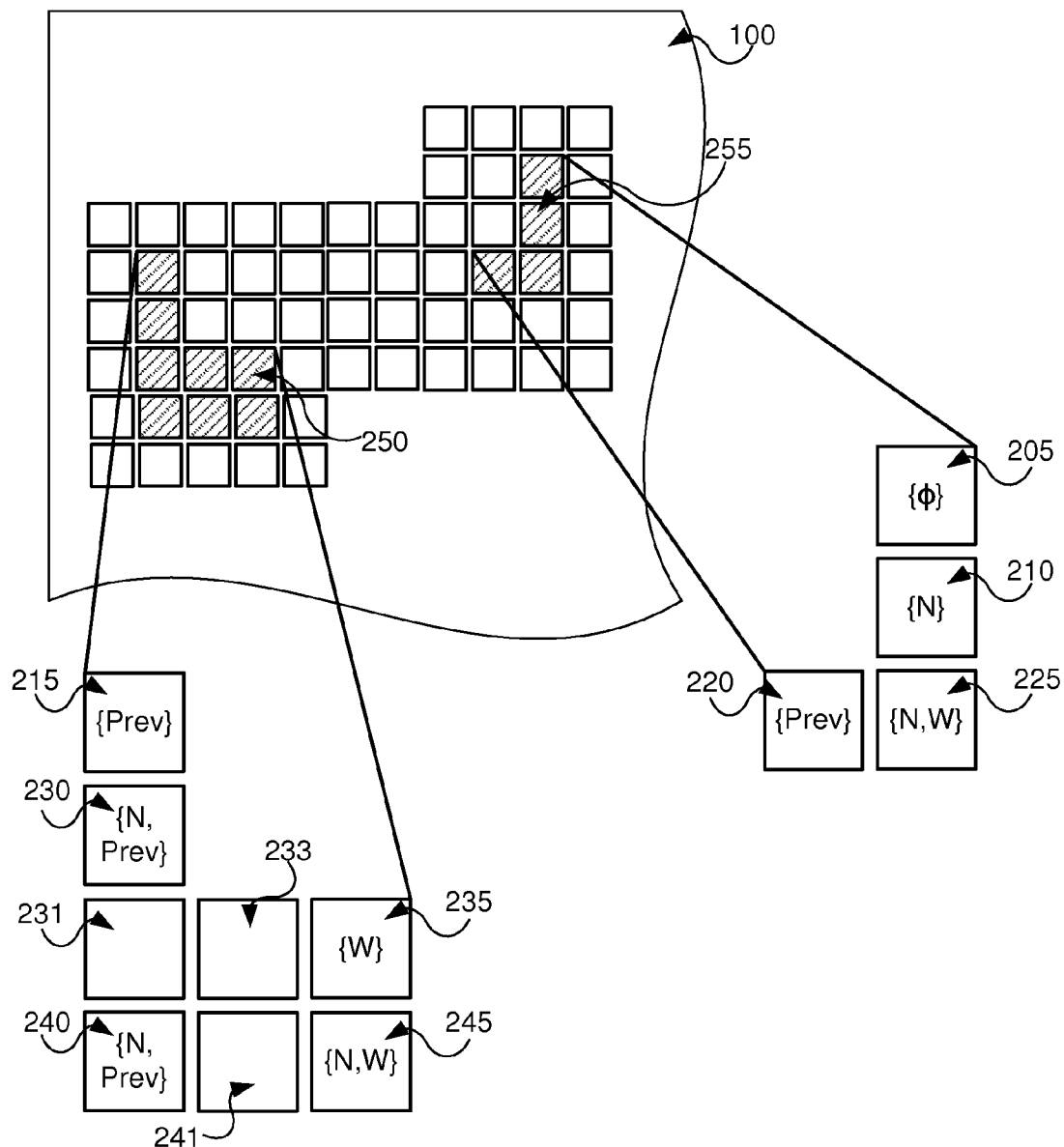
FIG. 2b schematically illustrates two regions to be compressed and also shows the context set of various pixel positions within those regions.

FIG. 2b shows a portion of the tile 100 with two shaded compression regions 250 and 255, having 8 pixels and 4 pixels respectively, and their respective context sets. Pixel position 205 contains the first value in tile 100 to be encoded by Context Encoder 335 as that is the first pixel position of the first compression region encountered in tile raster order. Since image data from pixel positions in tile 100 not compressed by the presently described methods is not available during context encoding, in view of the operation of the hybrid compression manager 350, and there is no preceding compression region pixel, the context set for pixel position 205 is defined as empty, {□}. The next compression region pixel is pixel position 210 which has a context set of {N} with N being the value at position 205. The next compression region pixel is pixel position 215. Because pixel position 215 is the first pixel of the compression region 250 to be encountered, W and N are not available for pixel position 215, that pixel position has a context set of {Prev}, with Prev being the value at position 210, the immediately preceding compression region pixel position in tile raster order being not adjacent to pixel position 215. The next pixel of interest is pixel position 220 which also has a context set of {Prev} with Prev being the value at pixel position 215, again the immediately preceding compression region pixel being not adjacent to pixel position 220. Next is pixel position 225 which has a context set of {N, W} with N and W being the values at pixel positions 210 and 220 respectively. Pixel position 230 follows in tile raster order and has a context set of {N, Prev} with N and Prev being the values at pixel positions 215 and 225 respectively. Ignoring pixel positions 231 and 233, pixel position 235 has a context set of {W} with W being the value at pixel position 233. Pixel position 240 has a context set of {N, Prev} with N and Prev being the values at pixel positions 231 and 235 respectively. Finally the last compression region pixel within the tile is at pixel position 245 which has a context set of {N, W}, with N and W being the values at pixel positions 235 and 241 respectively. The various examples discussed above and illustrated in FIG. 2b represent each of the range of combinations of contexts available for the encoding of the image data at a particular pixel position.

The rule defined by the examples of FIG. 2b for forming the context set for a current pixel position may be summarised as:
  include N if it is available;
  include W if it is available; otherwise include Prev if it is available and is distinct from N.

Turning again to FIG. 3, the Alternative Encoder 340 operates in a fashion distinct from the Context Encoder 335. Image data compressed with or by the Context Encoder 335 comes from one or more compression regions in a given tile stored in the Image Data Value Runs 325 buffer. Image data is passed to Context Encoder 335 by the Hybrid Compression Manager 350, which guides the overall compression process. For example, compression regions 250 and 255 are compressed by Context Encoder 335, while the rest of the data in tile 100 is compressed by Alternative Encoder 340. In the illustrated Hybrid Compression System 330, there is only one alternative encoder 340, but in general in a hybrid system there may be an arbitrary number of such encoders. Encoder selection is performed by the Hybrid Compression Manager 350. The Context Encoder 335 uses a memory buffer labelled Difference Values 345 to store differences between each image data value to be encoded and exactly one image data value determined from its corresponding context set. These differences are entropy encoded using an Entropy Encoder 337 and then passed to the Compressed Data Memory Manager 360. The Compressed Data Memory Manager 360 merges the entropy encoded bit stream with any encoded data output from the Alternative Encoder 340 and stores the merged bit stream in the Compressed Raster Image Processor (RIP) Output buffer 365.

Figure 4:
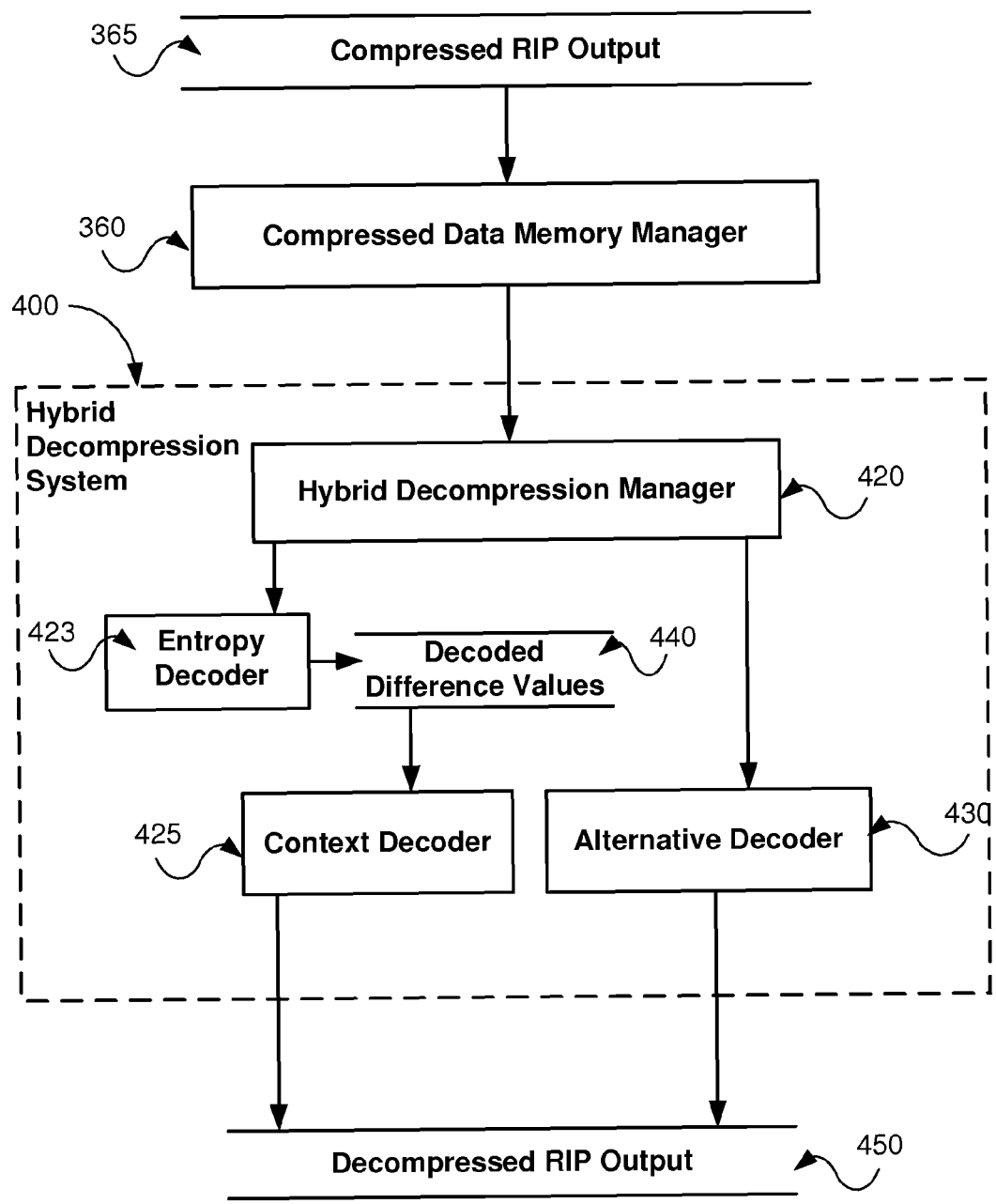
FIG. 4 is a schematic dataflow diagram showing a Hybrid Decompression System complementing the Hybrid Compression System of FIG. 3.

FIG. 4 is a data flow diagram showing a complementary Hybrid Decompression System 400 which contains a complementary Context Decoder 425 and a complementary Alternative Decoder 430. The encoded bit stream stored in the Compressed RIP Output buffer 365 is retrieved by a Compressed Data Memory Manager 360 and passed to a Hybrid Decompression Manager 420. The Hybrid Decompression Manager 420 guides the overall decompression process by analysing the encoded bit stream and directing portions of it to the appropriate decoder. The bit stream to be decoded by the Context Decoder 425 is first entropy decoded by an Entropy Decoder 423 and then stored in the buffer labelled Decoded Difference Values 440. Only the regions of the tile that have been encoded by the Context Encoder 335 are decoded by the Context Decoder 425. The rest of the tile image data is decoded by the Alternative Decoder 430. In the system of FIG. 4 there is shown only one alternative decoder, but in general, in a hybrid compression/decompression system, every encoder has a corresponding decoder, so the number of decoders is the same as the number of encoders. A memory buffer labelled Decoded Difference Values 440 contains the difference values decoded by Entropy Decoder 423 to be used to decode the image data values.

Figure 5:
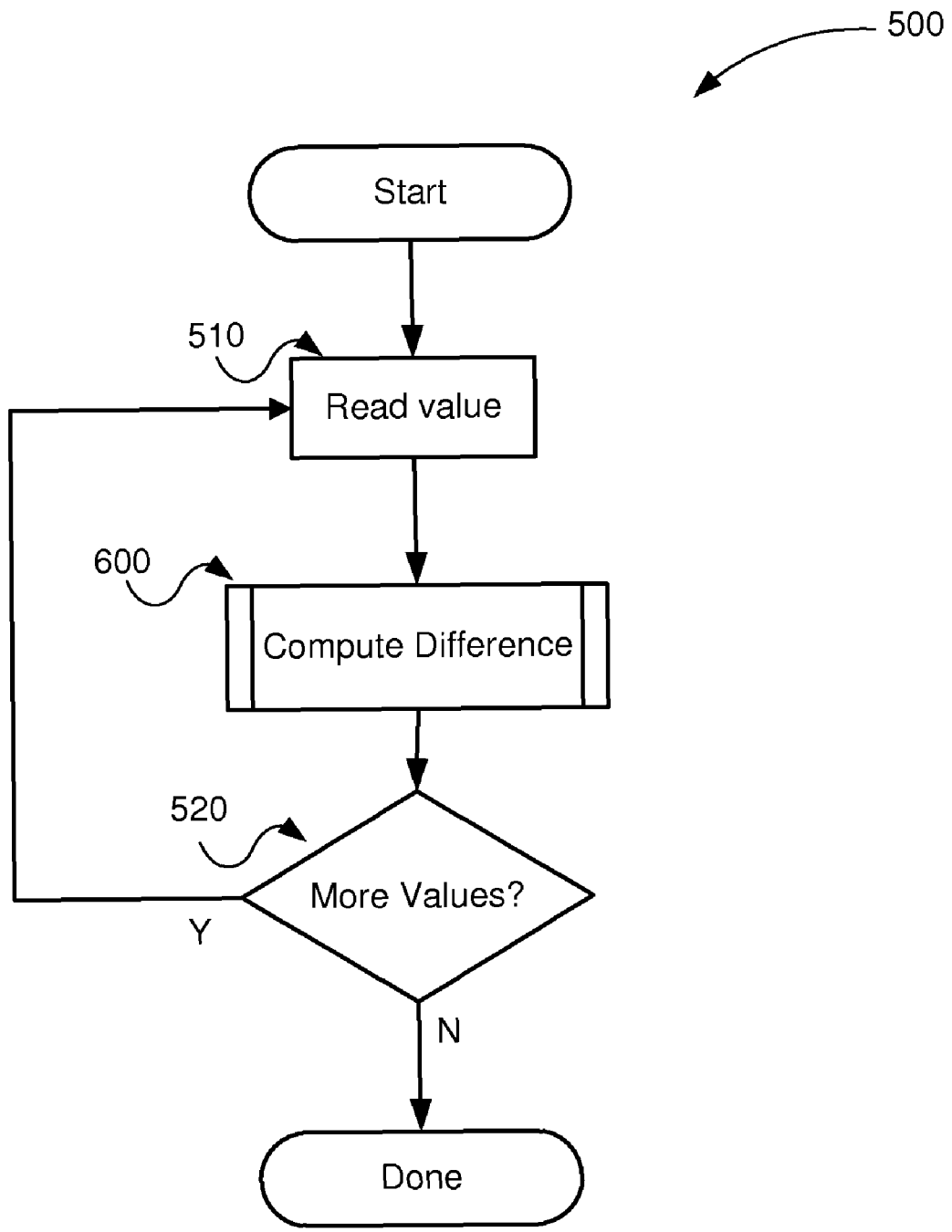
FIG. 5 is a schematic flow diagram showing the encoding process carried out by Context Encoder 335 within the Hybrid Compression System of FIG. 3.

FIG. 5 is a schematic flow diagram illustrating an Encoding Process 500 carried out by the Context Encoder 335. The process 500 first reads the value to be encoded in step 510. A sub-process Compute Difference 600 then encodes computes a difference value at the current pixel position. The sub-process 600 is described below with reference to FIG. 6 in detail. Next, decision step 520 checks if there are more image data values to encode. If there are more image data values to encode, steps 510 and 600 are repeated for each of those image data values. Difference value computation is complete when there are no more image data values to process i.e. sub-process 600 has been performed for all image data values from all compression regions (decision step 520). When there are no more image data values to encode, process 500 terminates. The process 500 preferably operates on a per tile basis and in tile raster order of compression region pixels.

FIG. 6 is a schematic flow diagram illustrating the sub-process Compute Difference 600 which computes the difference value for a given (current) pixel position. Step 605 first determines the elements of the context set for the current pixel position as shown in the examples illustrated in FIG. 2b. Decision step 610 checks if there are values in the context set for which to perform step 615. If there are such context set values, step 615 calculates the difference between the image data value at the current pixel position and that context set value. When step 615 has been performed for all context set values, step 620 then, according to an encoding rule of the present disclosure, selects the least positive difference out of the differences calculated in step 615, and writes the least positive difference into the Difference Values buffer 345. When the context set is empty (e.g. for the pixel position 205), the difference between the image data value at that pixel position and 0 is written to Difference Values buffer 345.

FIG. 7 is a schematic flow diagram illustrating Decoding Process 700 carried out by the Context Decoder 425 in the system 400. Difference values are read from Decoded Difference Values buffer 440 in step 710. Each of the difference values is decoded by Decode Value sub-process 900 until there are no more values to decode, as determined in decision step 720.

Figure 9:
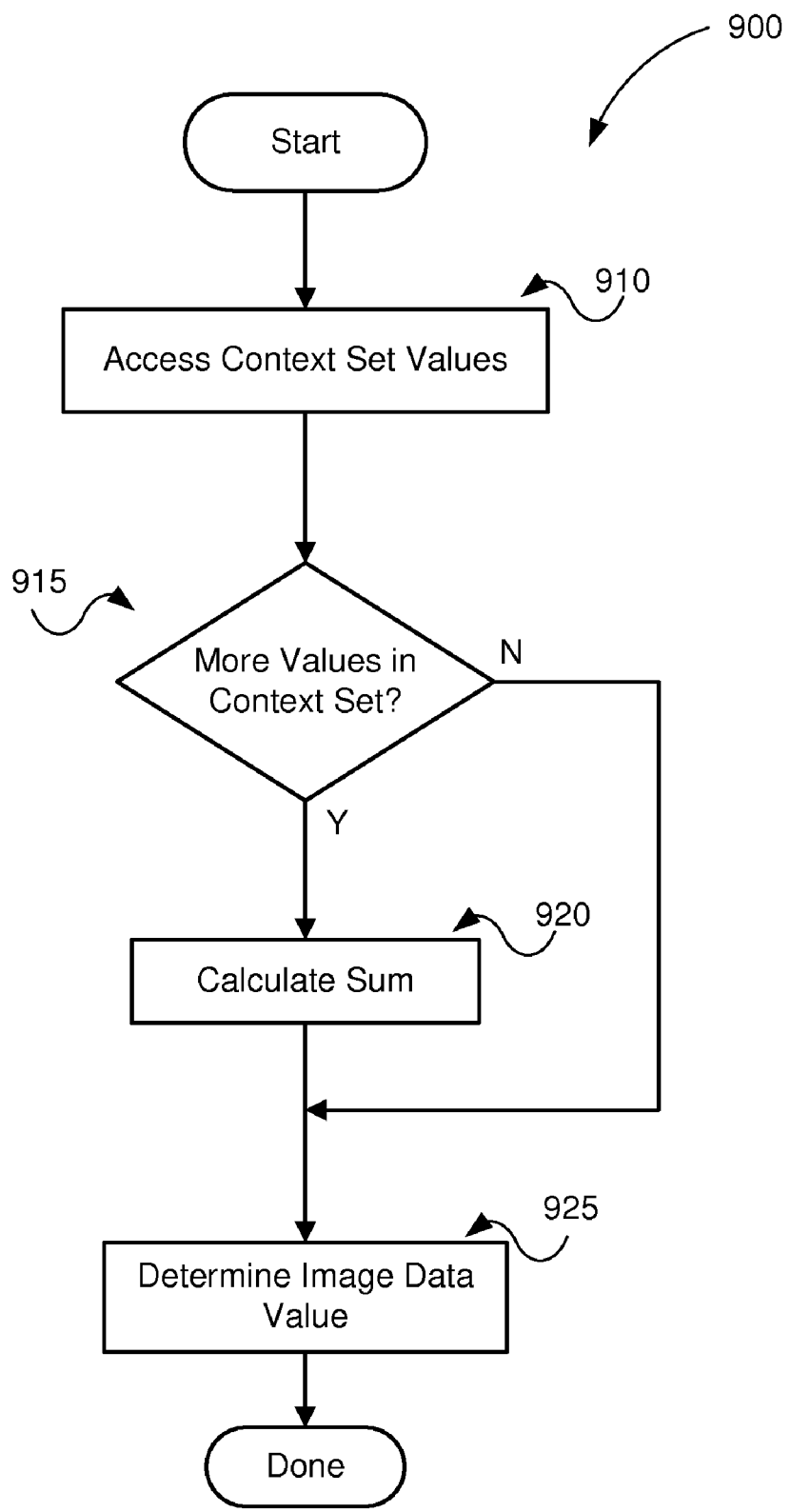
FIG. 9 is a schematic flow diagram showing the process of decoding an image data value within the decoding process of FIG. 7.

FIG. 9 is a schematic flow diagram illustrating sub-process Decode Value 900 which decodes the original image data value using the difference value D' extracted from the Decoded Difference Values buffer 440 and the context set values of the current pixel position. Step 910 accesses the context set values for the image data value at the current pixel position as in step 605 of method 600. Since decoding is performed in the same order as encoding, all available context set values for the current pixel position have already been determined by the decoding of the prior pixel positions. (Only image data values decoded by Context Decoder 425 are available.) Decision step 915 checks if there are context set values for which to perform step 920. Step 920 computes a possible value $x_j$ as the sum of the extracted difference value D' and a context set value. If there are no more context set values for which $x_j$ has to be computed, execution proceeds to step 925. In step 925, the original image data value X at a current pixel position is determined by a decoding rule according to the present disclosure by choosing the most positive possible value $x_j$ computed in step 920 and X is written to Decompressed RIP Output buffer 450.

A set of formulae used in encoding and decoding in a preferred arrangement are described now. The present encoding and decoding methods have been developed to efficiently process difference values for an image with predominantly increasing image data values in encoding order. Whilst lossless encoding and decoding of essentially random image data values (eg. bitmap) may be performed, such is not efficiently performed by the present methods and may be performed by alternate methods. However, where the image data values are predominantly increasing, such as with image fill indices discussed above, substantial efficiencies are obtained due to the nature of such data, as will be apparent from the following.

The computations of step 615 are as follows. Firstly, the difference $d_j$ between a current image data value X and each context value $context_j$ in the context set of the position corresponding to X, is calculated with the formula:

$$d_j = X - context_j \qquad (1)$$

Secondly, the least positive difference $d_j$ is selected in step 620 to be entropy encoded:

$$D = \min(d_j), j = 0 \ldots R-1 \qquad (2)$$

where R is the number of elements of the context set of X.

The decompression process starts by firstly reading in step 710 the compressed difference value D' from Decoded Difference Values buffer 440. Then, all possible values $x_j$ being the sum of D' and the context values for the given pixel position are computed in step 920. The original image data value is the most positive possible value $x_j$:

$$x_j = D' + context_j \qquad (3)$$

$$X = \max(x_j) \qquad (4)$$

Figure 10A:
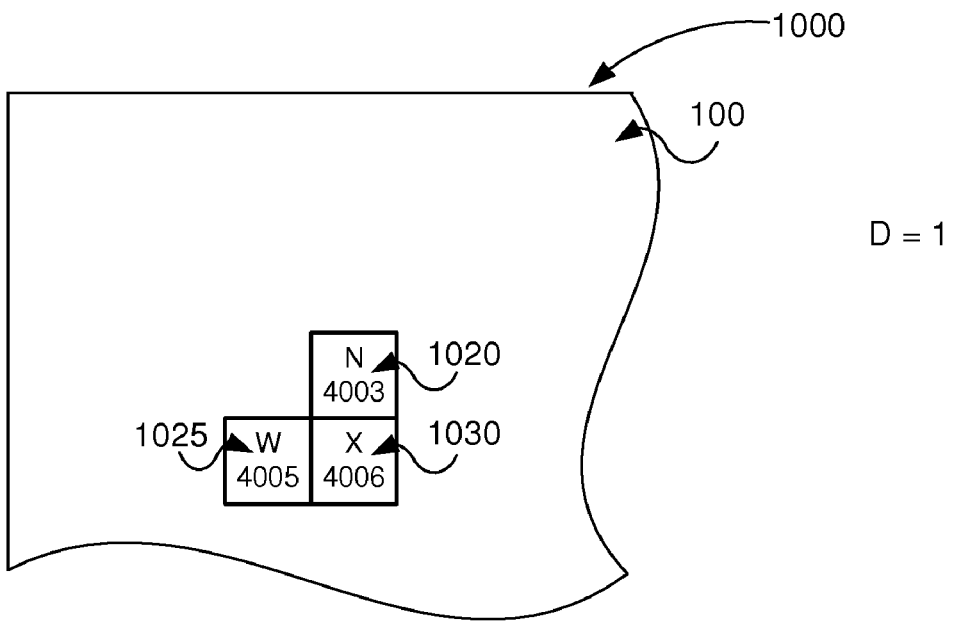
FIGS. 10a and 10b are illustrations of two examples of image data values on a page, their contexts and the corresponding difference values generated according to the method of FIG. 6.
Figure 10B:
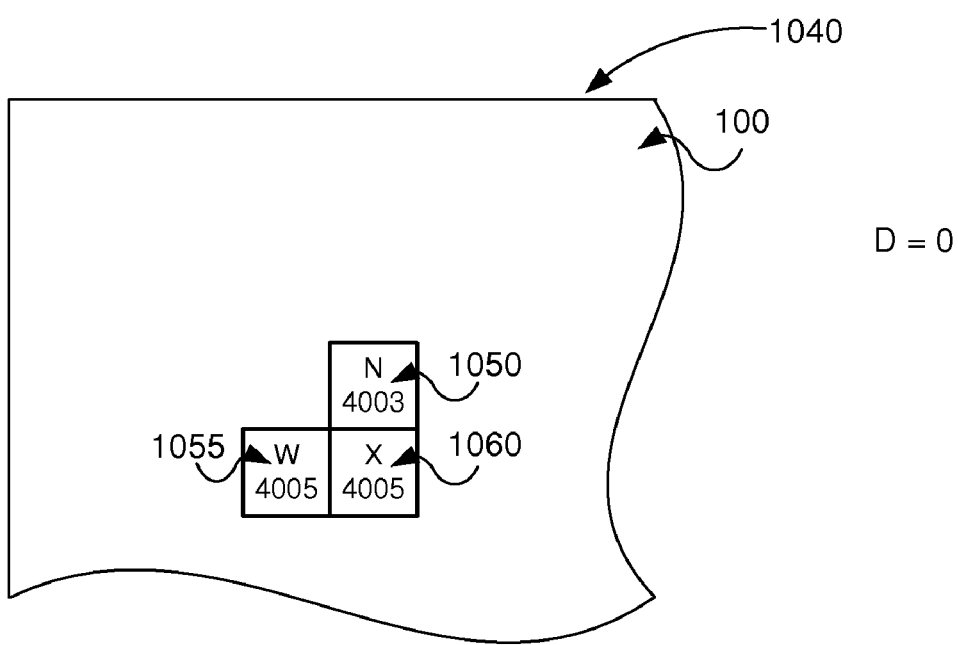
Figure 10C:
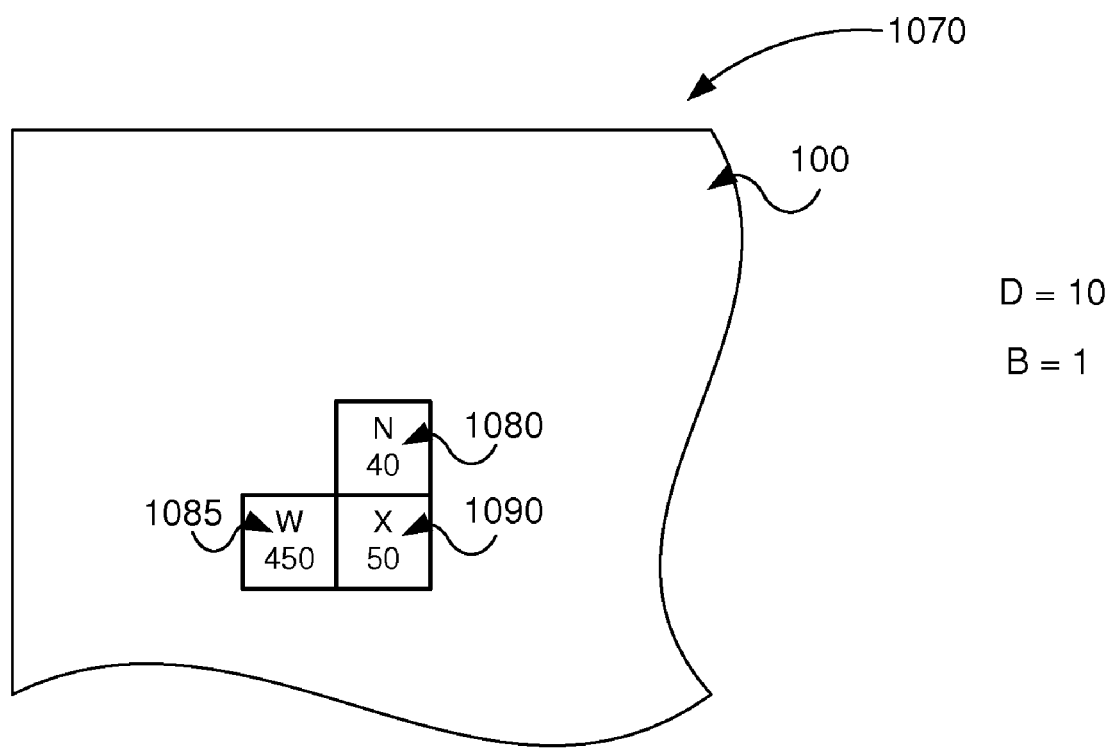
FIG. 10c is an illustration of an example of an image data value on a page, its context and the difference value generated according to an alternative embodiment of the invention for data with neither apparent nor known trend and FIG. 11 schematically illustrates an example of the compression algorithm according to the present disclosure.

FIGS. 10a, 10b and 10c show examples of image data values at a given pixel position and its context set. An image data value is given for each pixel position N, W and X on each of FIGS. 10a, 10b and 10c. FIGS. 10a and 10b will be used to illustrate the encoding method of FIG. 6. Both figures contain examples where data increases monotonically, or at least substantially monotonically, a typical trend to which the presently described compression arrangements are well adapted. FIG. 10c shows data which differs from the typical trend and is used to illustrate the general case when data either does not follow a trend or the trend is unknown, a case described below.

The context set for each of the two examples of current pixel positions 1030 and 1060 in FIGS. 10a and 10b, respectively, is {N, W}. Therefore, step 615 will have to be processed for both N and W in both examples.

For FIG. 10a, two difference values $d_0$ and $d_1$ are computed, those being: $d_0 = X - N = 4006 - 4003 = 3$, while the difference value $d_1 = X - W = 4006 - 4005 = 1$. The difference value $d_1 = 1$ is chosen to be encoded for the current pixel position X, 1030, as it is the least positive of the two computed differences according to the encoding rule mentioned above.

During decompression of the data related to FIG. 10a, the difference value 1 is extracted and added to N=4003, resulting in the sum $x_0 = 4004$. The value 1 is also added to W=4005, which results in $x_1=4006$. The most positive sum, $x_1=4006$, is then chosen as the decoded image data value X according to the decoding rule established above.

For FIG. 10*b*, two difference values $d_0$ and $d_1$ are computed, those being: $d_0=X-N=4005-4003=2$, while the difference value $d_1=X-W=4005-4005=0$. The difference value $d_1=0$ is chosen to be encoded for the current pixel position X, 1060, as it is the least positive of the two computed differences. During decompression, the difference value D'=0 is extracted and added to N=4003, resulting in the sum $x_0=4003$; D'=0 is also added to W=4005, which results in $x_1=4005$. The most positive sum, $x_1=4005$, is the decoded image data value X.

FIG. 11 shows a worked example of encoding according to the above rules and which operates upon a data set of compression region pixels having a corresponding arrangement within a tile as those seen in FIG. 2*b*. FIG. 11 shows a tile 1100 having compression regions 1120 and 1122 each identifying compression region pixels in raster tile order numbered 1101-1112. According to their contexts as illustrated and the compression rules identified above, each of the image data values at the pixel positions 1101-1112 are encoded to form a difference stream 1124 which may then be entropy encoded to further reduce its size.

The set of formulae used in an alternative arrangement adapted to an image with predominantly decreasing image data values in encoding order is defined as follows. Firstly, the difference $d_j$ between X and each context set value in its context set is calculated in step 615' with the formula:

$$d_j = \text{context}_j - X \quad (5)$$

Secondly, as in step 620, the least positive difference $d_j$ is chosen to be entropy encoded:

$$D = \min(d_j), j=0\ldots R-1 \quad (6)$$

where R is the number of elements of the context set of X. The least positive difference D is entropy encoded and written to Compressed RIP Output 365.

Note that the subtraction of equation (5) complements that of equation (1).

The decompression process 700', according to this alternative arrangement, starts by firstly extracting in step 710 the decoded difference value D' from Decoded Difference Values buffer 440. Then, all possible values $x_j$ based on the difference between the context set values for the given pixel position and D' are computed. The decoded image data value is the least positive possible value $x_j$ (step 925'):

$$x_j = \text{context}_j - D' \quad (7)$$

$$X = \min(x_j), j=0\ldots R-1 \quad (8)$$

In equation (7) the difference value is subtracted from each decoded value in the context set.

When data neither exhibits monotonically increasing or monotonically decreasing trend, or when the trend of data is unknown, either formula (1) or (5) can be used for each pixel position to compute the differences. The encoding process then selects the difference whose absolute value is closer to 0 (ie. the smallest absolute value). In this general arrangement, some extra information has to be included in the encoding of each difference value to specify the context set value used in the computation. This is accomplished by just one bit (0 or 1), denoted as identifier B, as there can be at most two elements in the context set for any pixel position. The previously processed image data value Prev is very often present in the pixel position W since each tile is processed in raster order. When W is not available, the possible context set elements are, at best, N and Prev. This alternative arrangement is illustrated using the example in FIG. 10*c*.

For FIG. 10*c*, the context set for the current pixel position X, 1090 comprises {N, W}. The two difference values $d_0$ and $d_1$ are computed using formula (1): $d_0=X-N=50-40=10$ and $d_1=X-W=50-450=-400$. The difference value $d_0=10$ is chosen to be the encoded D for the current pixel position X, 1090, as its absolute value is closer to 0 than the value of $d_1$. Further, the value of do will be encoded with fewer bits. The identifier B=0, specifying that the first element in the context set has been used for encoding, is stored along with D'. Had the second element been used, then B would be set to B=1. During decompression, D'=10 and B=0 are extracted. Since the value of identifier B specifies that the first context set value (N) is to be used, the sum N+D'=50 is computed, and this is the decoded image data value X.

INDUSTRIAL APPLICABILITY

The arrangements described are applicable to the computer and data processing industries and particularly for the compressed storage of images with generally increasing or decreasing image data values in encoding order, such as index values.

The foregoing describes only some embodiments of the present invention, and modifications and/or changes can be made thereto without departing from the scope and spirit of the invention, the embodiments being illustrative and not restrictive.

We claim:

1. A method of encoding a set of data values, each said data value corresponding to a pixel position for representing an image, said method comprising, for a current said data value at a current pixel position, the steps of:
    using at least one processor to execute instructions stored in memory to perform steps comprising:
    (a) creating a context set for said data value, said context set including a data value at a pixel position in said set immediately preceding said current pixel position in an encoding order, wherein said immediately preceding pixel position is not adjacent said current pixel position within said image; and
    (b) encoding said data value using said created context set.

2. A method according to claim 1, further comprising, prior to step (a), the step of:
    segmenting the image for extracting the set of data values for encoding using steps (a) and (b), and another set of data values in the image is encoded using an alternative encoding method.

3. A method according to claim 1, wherein said encoding comprises the steps of:
    (b)(i) computing a difference value using said current data value and each said data value in said context set; and
    (b)(ii) encoding said current data value by encoding the least positive said computed difference value.

4. A method according to claim 3 wherein the set of data values are predominantly increasing in encoding order and the difference value is computed by subtracting each said data value in said context set from said current data value.

5. A method according to claim 3 wherein said set of data values are predominantly decreasing in encoding order and the difference value is computed by subtracting said current data value from each said data value in said context set.

6. A method according to claim 1, wherein said encoding order is a raster order and said context set further includes the data value at a pixel position immediately above said current pixel position in said raster order.

7. A method of encoding a set of data values, each said data value corresponding to a pixel position within an image, said method comprising, for a current said data value at a current pixel position, the steps of:
  using at least one processor to execute instructions stored in memory to perform steps comprising:
  (a) creating a context set comprising a plurality of previously encoded data values;
  (b) computing a difference value using said current data value and each said data value in said context set; and
  (c) encoding said current data value by encoding the least positive said computed difference value.

8. A method according to claim 7 wherein the set of data values are predominantly increasing in encoding order and the difference value is computed by subtracting each said data value in said context set from said current data value.

9. A method according to claim 8 wherein the data values are substantially monotonically increasing in encoding order.

10. A method according to claim 7 wherein said set of data values are predominantly decreasing in encoding order and the difference value is computed by subtracting said current data value from each said data value in said context set.

11. A method according to claim 10 wherein the data values are substantially monotonically decreasing in encoding order.

12. A method according to claim 7, said method further comprising:
  selecting the difference value having the smallest absolute value; and
  setting an identifier associated with the selected difference value to identify which of the data values in said context set was used to compute the selected difference value;
  wherein step (c) further encodes the identifier.

13. A method of decoding an encoded set of data values, each said data value corresponding to a pixel position within an image, said method comprising, for a current said encoded data value at a current pixel position, the steps of:
  using at least one processor to execute instructions stored in memory to perform steps comprising:
  (a) creating a context set comprising a plurality of previously decoded data values;
  (b) computing possible values using a difference value and said decoded data values in said context set; and
  (c) decoding said encoded data value by selecting one of the computed possible values.

14. A method according to claim 13 wherein the set of data values are predominantly increasing in encoding order, step (b) comprises adding said difference value to each said decoded data value in said context set, and step (c) comprises selecting the most positive computed possible value.

15. A method according to claim 14 wherein the data values are substantially monotonically increasing in encoding order.

16. A method according to claim 13 wherein said set of data values are predominantly decreasing in encoding order, step (b) comprises subtracting said difference value from each said decoded data value in said context set, and step (c) comprises selecting the least positive computed possible value.

17. A method according to claim 16 wherein the data values are substantially monotonically decreasing in encoding order.

18. A method according to claim 13 wherein step (b) comprises adding said difference value to the decoded data value in said context set identified by the identifier associated with said difference value.

19. A computer readable storage medium having a computer program recorded thereon, the program being executable by a computer device to encode a set of data values, each said data value corresponding to a pixel position for representing an image, said program comprising:
  code for processing a current said data value at a current pixel position, said code for processing including:
  (a) code for creating a context set for said data value, said context set including a data value at a pixel position in said set immediately preceding said current pixel position in an encoding order, wherein said immediately preceding pixel position is not adjacent said current pixel position within said image; and
  (b) code for encoding said data value using said created context set.

20. A computer readable storage medium having a computer program recorded thereon, the program being executable by a computer device to encode a set of data values, each said data value corresponding to a pixel position within an image, said program comprising:
  code for processing a current said data value at a current pixel position, said code for processing including:
  (a) code for creating a context set comprising a plurality of previously encoded data values;
  (b) code for computing a difference value using said current data value and each said data value in said context set; and
  (c) code for encoding said current data value by encoding the least positive said computed difference value.

21. A computer readable storage medium having a computer program recorded thereon, the program being executable by a computer device to decode an encoded set of data values, each said data value corresponding to a pixel position within an image, said program comprising:
  code for processing a current said encoded data value at a current pixel position, said code for processing comprising:
  (a) code for creating a context set comprising a plurality of previously decoded data values;
  (b) code for computing possible values using a difference value and said decoded data values in said context set; and
  (c) code for decoding said encoded data value by selecting one of the computed possible values.

* * * * *